United States Patent

Inoue

[11] Patent Number: 5,864,347
[45] Date of Patent: Jan. 26, 1999

[54] APPARATUS FOR MANIPULATION OF DISPLAY DATA

[75] Inventor: Kazuaki Inoue, Suwa, Japan

[73] Assignee: Seiko Epson Corporation, Tokyo, Japan

[21] Appl. No.: 819,779

[22] Filed: Mar. 18, 1997

Related U.S. Application Data

[63] Continuation of Ser. No. 498,106, Jul. 5, 1995, abandoned, which is a continuation of Ser. No. 77,214, Jun. 14, 1993, abandoned.

[30] Foreign Application Priority Data

Jun. 15, 1992 [JP] Japan .................................. 4-155085

[51] Int. Cl.$^6$ ....................................................... G09G 5/00
[52] U.S. Cl. ........................... 345/516; 345/126; 345/127
[58] Field of Search ..................................... 345/516, 515, 345/193, 507, 28, 126, 127, 145, 121; 395/166, 137

[56] References Cited

U.S. PATENT DOCUMENTS

| | | | |
|---|---|---|---|
| 4,611,232 | 9/1986 | Searby | 345/126 |
| 4,618,858 | 10/1986 | Belch | 345/120 |
| 4,839,826 | 6/1989 | Urushibata | 345/126 |
| 4,920,504 | 4/1990 | Sawada et al. | 345/190 |
| 4,952,920 | 8/1990 | Hayashi | 345/126 |
| 4,952,923 | 8/1990 | Tamura | 345/127 |
| 5,040,129 | 8/1991 | Nishiyama | 345/190 |
| 5,067,167 | 11/1991 | Berger | 345/126 |
| 5,146,211 | 9/1992 | Adams et al. | 345/145 |

OTHER PUBLICATIONS

"Applied Concepts in Microcomputer Graphics", Artwick, Bruce A., Prentice–Hall, Inc., New Jersey, Jan. 1984, pp. 201–203.

"Microcomputer Displays, Graphics, and Animation", Artwick, Bruce A., Prentice–Hall, Inc., New Jersey Jan. 1985, pp. 199–201.

*Primary Examiner*—Vivian Chang

[57] ABSTRACT

A display control circuit that enables efficient image rotation, and scaling of bit-mapped image data stored in image memory, in synchronization with dot clock, line, or frame timing of a target display device without requiring re-writing of the display memory contents. Addresses output from a memory address counter are modified by multiplication and summation with desired image display parameters to generate new addresses for retrieving desired image data from memory locations that are physically mapped to the modifications desired for a new output image. The basic image data is not itself modified. Timing of multiplication and summation processes is synchronized to the timing of the target display device and is performed during horizontal or vertical retrace line intervals. Additional summations of address values with the display parameters is performed by dot and line. It is, therefore, possible to achieve smooth image rotation without relying on high clock rate multiplication operations timed to the dot clock frequency by using a multiplication operation once every display frame or line, and a cumulative addition operation once every dot or display line. Multipliers can operate at a low clock rate, and time-shared use is possible, enabling the circuit to be constructed on a small scale and at low cost.

28 Claims, 14 Drawing Sheets

APPARATUS FOR MANIPULATION OF DISPLAY DATA

This is a continuation of U.S. patent application Ser. No. 08/498,106, filed Jul. 5, 1995, now abandoned, which is a continuation of application Ser. No. 08/077,214, filed Jun. 14, 1993 (now abandoned).

BACKGROUND OF THE INVENTION

1. Field of the Invention

The present invention relates to video display memory operating in association with a central processing unit and more particularly to an apparatus and method for modifying image data storage addresses to enable rotation and scaling of bit-mapped images for display on a display device. The invention further relates to apparatus for reducing the impact of image manipulation on central processor resources.

2. Related Technical Art

In a conventional video image display system, such as the one illustrated in FIG. 2, bit-mapped images are stored in a memory array prior to display. That is, the image data is stored across an array of storage or memory address locations in memory which correspond to relative horizontal and vertical positions of the data within the output image. Each unit of data is stored at an address having a horizontal or "X" position or value, and a corresponding vertical or "Y" value.

As shown in FIG. 2, for both writing or storing data in video memory, as well as for subsequent data retrieval from memory, the data addresses can be easily selected using horizontal and vertical address counters, 11 and 12, respectively. These counters can be incremented with respect to their designated axis, so as to retrieve data by stepping through the memory array in synchronization with a particular display device 10.

The image data is prepared for transfer from memory 9 by a central processing unit 14, possibly using a video operations control circuit 8. A parameter register file 13, or similar data storage unit, can be used to store image parameters such as absolute horizontal and vertical coordinates, scale, angle and axis of rotation, etc. The image data is subsequently retrieved and presented visually in the same geometric relationship or sense, that is axial alignment and relative size, as it is stored in memory 9. If the image is to be altered, therefore, such as by re-scaling or rotating, the image data must first be retrieved and processed by CPU 14 or operations circuit 8, and then written or re-written into memory 9.

Unfortunately, this technique has several drawbacks. One problem is that the time required to retrieve, modify, and re-write the image data reduces the operating speed of the video system, which is very undesirable for modern computer systems. A second problem with this method is that modification of the display data by the CPU, directly or through an operations circuit, and re-writing the contents of display memory obliterates the original data, requiring additional processing to regain the original image data if it is desired at a later time. A third major problem is that it has not been possible to precisely control or provide image rotation and re-scaling operations that are properly synchronized with the pixel, raster, or frame unit timing of the display. As a result, smooth image rotation on a display with different angles of rotation in each frame, and images with realistic perspective projections which are achieved by using a different magnification rate at each pixel or raster unit, cannot be achieved.

A new method and apparatus is needed, therefore, which allows proper synchronization of image manipulations with the display device timing and achieves high speed, high precision image presentation at reasonably high resolutions.

SUMMARY OF THE INVENTION

In view of the problems encountered in the art, one purpose of the present invention is to provide a video data processor that achieves image data rotation and scaling operations synchronously with the appropriate display unit timing.

An advantage of the invention is that it does not require very high speed components to accommodate high speed or high resolution display devices.

These and other purposes, objects, and advantages are realized in an image display operations controller for use in a display system that has a display memory for storing image data, and a raster or line scan-type display device for receiving and viewing the image data as it is retrieved from memory. An address counter is used to generate initial addresses for retrieving data from the display memory for viewing on the display device, and a parameter memory is used to store display rotation, or scaling parameters representative of desired image manipulations. The display operations controller is connected in series between both the address counter and parameter memory, and the display memory so that it receives the initially generated addresses, and display parameters, and provides altered addresses to the display memory for data retrieval. The display operations controller is also connected to receive at least three signals which are at least synchronized to vertical synchronization, horizontal synchronization, and dot clock signals, respectively for the display device, so that the altered addresses are provided in synchronization with the display device timing to achieve smooth image transitions when using the display parameters to control data retrieval. Using signals synchronized to the vertical, horizontal, and dot clock or pixel timing of the display device, provides an output image that is properly synchronized with the display device while providing advanced image manipulation functions.

The display operations controller typically uses a multiplier to receive the generated addresses as one input and rotation, enlargement, or reduction parameters as another input and generates a product of these inputs during a preselected timing period. This timing period can be the vertical or horizontal retrace time interval or one frame or line period for the display device. This product is input to a summation element where it is added cumulatively to the rotation, enlargement, or reduction parameters with intermediate summations being performed at a rate corresponding to a second preselected synchronization rate which is preferably an integer multiple of the dot clock rate, the preferred integer value being one. That is, the initial address values are altered for each horizontal line to be scanned according to the basic parameters, and this value is then used to form addresses at each dot position across the line. Alternatively, the summation process is performed at a clock rate corresponding to a signal synchronized to the horizontal synchronization signal of the display device or the horizontal synchronization signal itself.

In further aspects of the invention, the display operations controller uses a multiplier to form the generated address and parameter products during one frame or line interval and a data latch to store the results at intervals corresponding to a clock rate of a vertical synchronization signal for said display device which is generally synchronized to one frame display period. The summation element then cumulatively adds the contents of the latch and the parameters with intermediate summations performed at a clock rate corresponding to an integer multiple of the dot clock rate for the display device, or a predetermined synchronization signal which is synchronized to the display frame, line, or horizontal timing for the display device.

In a further alternative, a degree of time-sharing of components can be achieved by connecting a multiplexer in series with the multiplier inputs to receive the different display parameters and selectively output one parameter to the multiplier in response to a predetermined synchronization signal, such as the dot clock signal for the display device. The multiplier outputs that result from using multiplexed inputs are then summed with the display parameters using a preselected synchronization signal as a clock, such as a signal synchronized to either the horizontal timing or an integer multiple of a dot clock for the display device.

In addition, certain initial address values can be generated and used to form later address values in association with the image display parameters and various multiplication and summation processes.

The apparatus can quickly manipulate the image through alteration of addresses being provided to retrieve data from image memory. The process is very effective even using slower components with high speed display devices, as double buffering and similar techniques can be employed to hold the parameter-address products so that they are ready when needed by the display to generate the desired addresses. This process also has the advantage that the original image data remains and can be quickly accessed without further processing when desired. The use of the various dot clock and horizontal synchronization signals also allows the display operations controller to implement several specialized operations on the data without burdening the CPU.

Other objects and attainments together with a fuller understanding of the invention will become apparent and appreciated by referring to the following description and claims taken in conjunction with the accompanying drawings.

DETAILED DESCRIPTION OF PREFERRED EMBODIMENTS

The present invention is a video data processor that operates to achieve the desired image data rotations and scaling operations synchronously with the appropriate display unit timing. The invention achieves these results by employing a video data control circuit to selectively retrieve stored video data and perform desired image manipulations on the data prior to transfer to the display unit. Data manipulations incorporate the required vertical and horizontal synchronization signals as a direct part of the manipulation process.

Figure 1:
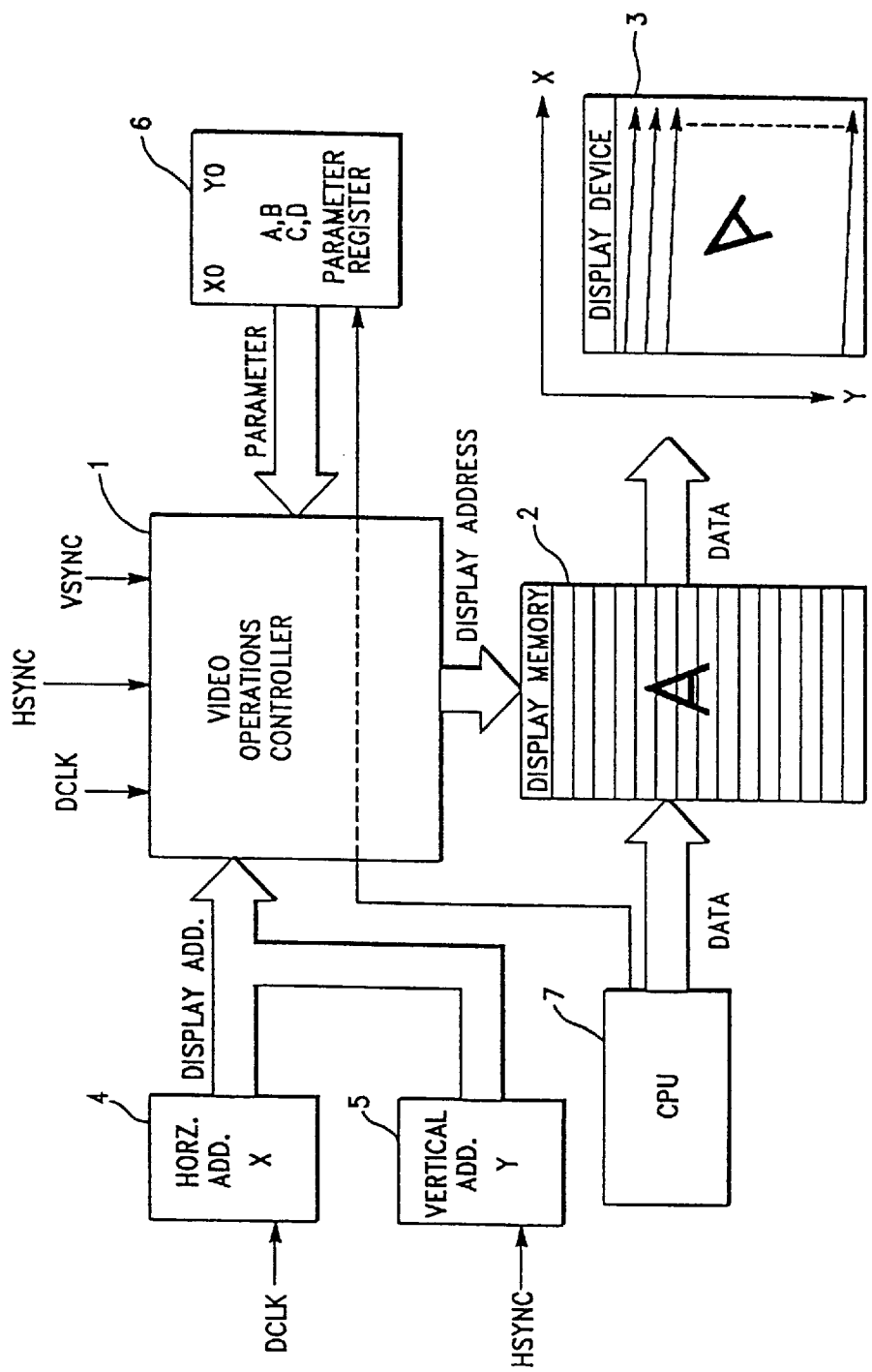
FIG. 1 illustrates a block diagram of a display system constructed and operating according to the principles of the present invention.
Figure 2:
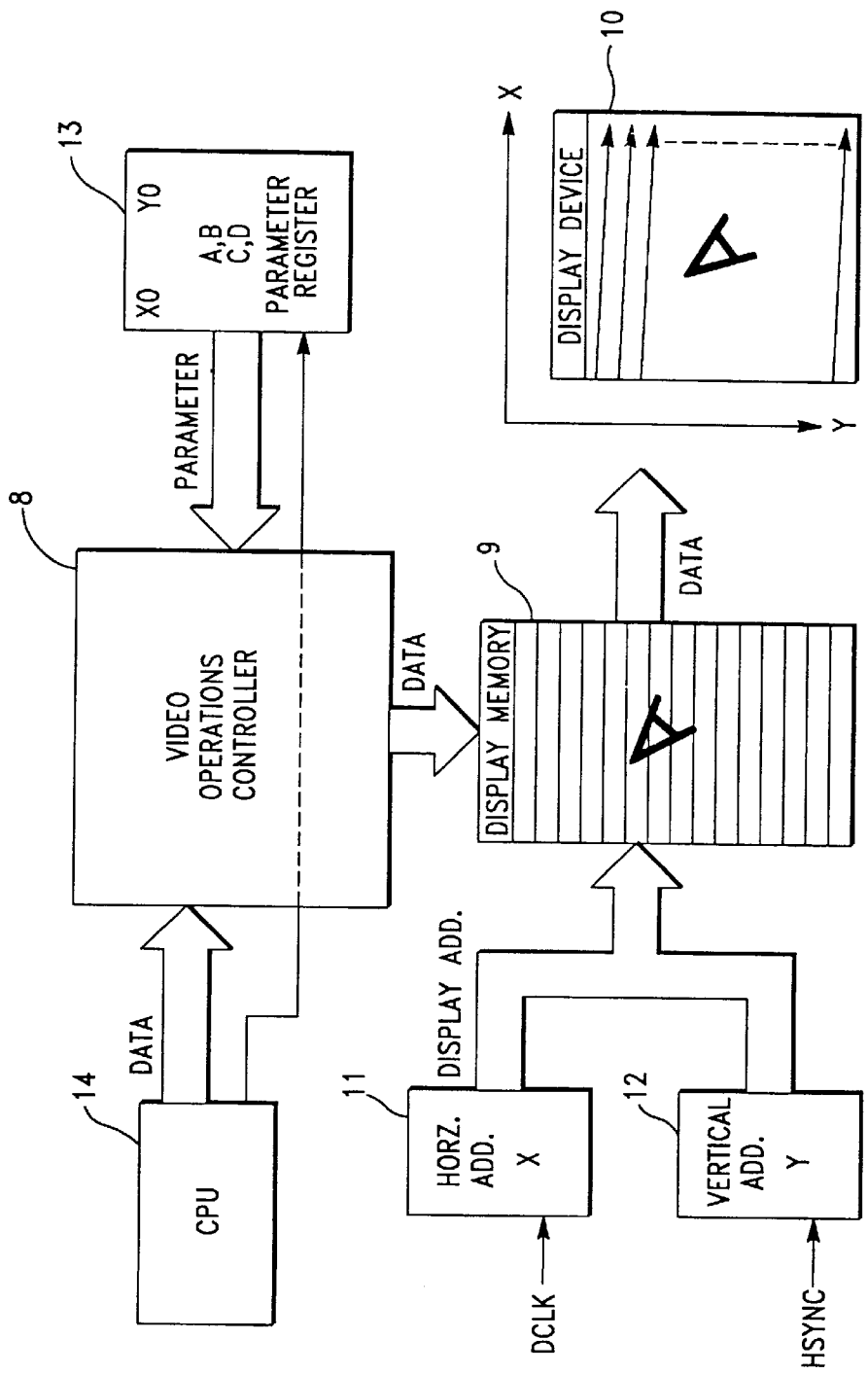
FIG. 2 illustrates a block diagram of a conventional display system.

A block diagram of a display system incorporating the features of and operating according to the present invention is illustrated in FIG. 1. In the system of FIG. 1, horizontal and vertical address counters 4 and 5, respectively, are used to provide the horizontal and vertical addresses as is typically done. A central processing unit (CPU) 7 is connected directly to address lines for a video data storage unit or display memory 2, and parameter register file or registers 6, which stores desired image parameters.

Display memory 2 is a read/write random access memory (RAM) type of device, and data written to this RAM is the original image data written from CPU 7 prior to any rotation, enlargement, or reduction processing. The horizontal display address counter 4 and vertical address counter 5 count the address corresponding to the display position on the display device 3. The position in the horizontal direction is counted using the dot clock signal DCLK as a clock input, and the position in the vertical direction is counted using the horizontal synchronization signal HSYNC as an input clock signal. A video data processor or operations controller 1 is connected in series between horizontal and vertical address counters 4 and 5, parameter register file 6, and video memory 2. Operations controller 1 functions as a video operations data transfer controller that redirects the flow of data and the application of stored parameters as desired. Operations controller 1 also receives the signals HSYNC, VSYNC, and DCLK as inputs, unlike devices previously used in the art.

When an image is to be displayed without applying rotation or scaling image processing, the outputs from address counters 4 and 5 are applied or transferred directly to video display memory 2 as the desired address for image data to be retrieved. The corresponding data is selected and output to display device 3 for viewing. When another form of image processing is to be applied to the image data before display, however, operations controller 1 receives and alters, that is intercepts or traps, the address counter outputs and processes them prior to transfer to video display memory 2. Operations controller 1 then applies altered or converted addresses as the desired addresses to be used for retrieving image data from video display memory 2. The display memory outputs data corresponding to image data stored at the converted display addresses, resulting in an output image that is subjected to rotation, enlargement, or reduction appearing on display device 3.

The method used by operations controller 1 to establish desired image data relationships for image rotation, enlargement, or reduction are described briefly next.

Parameter registers 6 provide previously stored input parameters to operations controller 1 that determine an angle of rotation, axis of rotation, and percentages or scaling factors for image enlargement and reduction which are to be used by operations controller 1. Operations controller 1 performs an affine transformation or mapping of the output of the horizontal and vertical address counters using the stored parameters according to the relationship:

$$\begin{bmatrix} X_2 \\ Y_2 \end{bmatrix} = \begin{bmatrix} A & B \\ C & D \end{bmatrix} \times \begin{bmatrix} X_1 - X_0 \\ Y_1 - Y_0 \end{bmatrix} + \begin{bmatrix} X_0 \\ Y_0 \end{bmatrix} \quad (1)$$

This transformation relationship can be rewritten by expanding the matrices using the relationships:

$$X_2 = A(X_1 - X_0) + B(Y_1 - Y_0) + X_0 \quad (2)$$

$$Y_2 = C(X_1 - X_0) + D(Y_1 - Y_0) + Y_0 \quad (3)$$

where, $X_0$ and $Y_0$ are central axes or the axes of rotation, $X_1$ and $Y_1$ are addresses output by the address counters, $X_2$ and $Y_2$ are address values in memory after image processing, and A, B, C, and D are parameters for angle of rotation and scaling ratios, which are generally defined by the relationships:

$$A = a \cos \theta \quad (4)$$

$$B = -b \sin \theta \quad (5)$$

$$C = a \sin \theta \quad (6)$$

$$D = b \cos \theta \quad (7)$$

where $\theta$ is the angle of rotation, and a and b are desired enlargement/reduction ratios or factors taken along the axes X and Y, respectively.

As a result, video operations controller 1 can obtain display addresses by applying the above factors to address counter output values $X_1$ and $Y_1$. To obtain addresses for an entire image display, the counters are simply incremented and the next set of address values processed.

Figure 3:
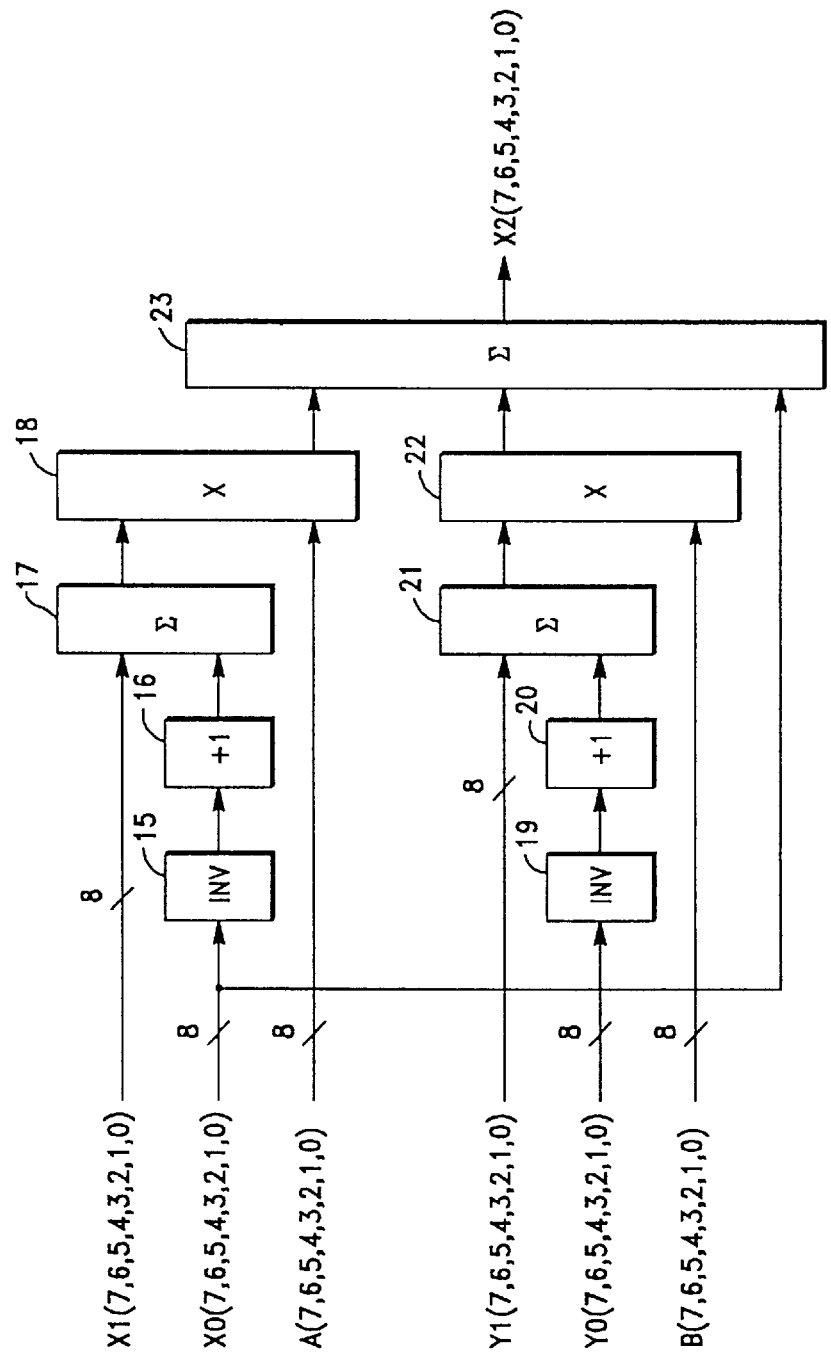
FIG. 3 illustrates a block diagram of a circuit useful for selecting horizontal display addresses for video display memory in the display system of FIG. 1.
Figure 4:
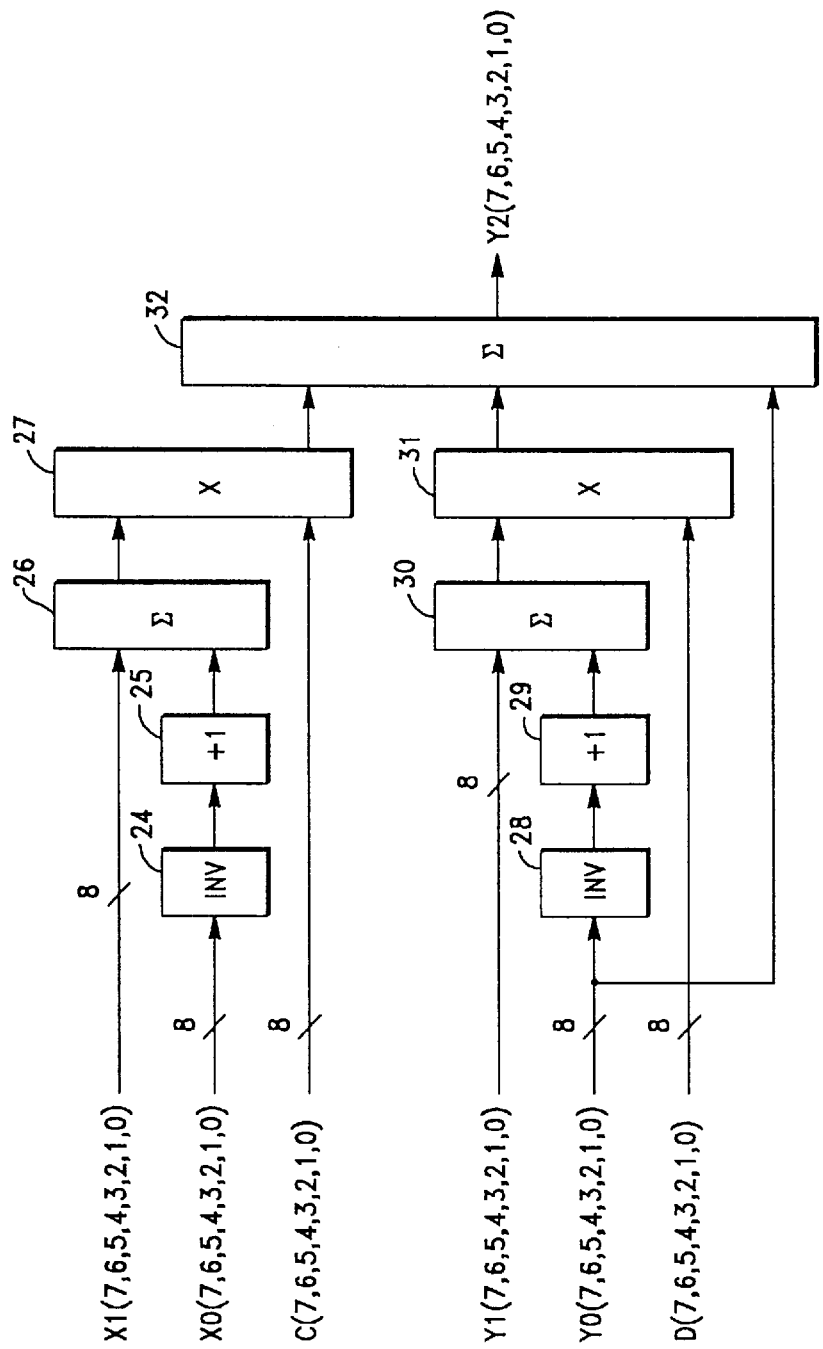
FIG. 4 illustrates a block diagram of a circuit useful for selecting vertical display addresses for video display memory in the display system of FIG. 1.

Schematics of circuits that are useful in implementing video operations controller 1 of the inventive display system, in accordance with the above relationships, are illustrated in FIGS. 3 and 4. Apparatus for processing address values using the parameters A and B discussed above, in order to obtain modified addresses, is presented in FIG. 3, while apparatus for parameter C and D related processing is presented in FIG. 4. During operation of the display system, address values $X_2$, $Y_2$ are each output from the respective circuits. In this exemplary embodiment, these circuits are shown processing 8-bit address values X and Y (having bits 7,6,5,4,3,2,1,0) as inputs on 8-bit wide data buses (\8), which allows a display resolution on the order of 256 by 256 dots. The rotation and scaling parameters also employ or allow the use of 8-bit precision in this example. Those skilled in the art will readily understand that 8-bit precision is used for purposes of clarity in illustration and that the teachings of the invention are also applicable to higher orders of precision as desired for specific applications.

Referring to FIG. 3, input values for $X_0$, $Y_0$ represent the center or absolute coordinates used for image rotation, which are input to bit inversion circuits 15 and 19, respectively, where they are inverted bit by bit. The values used for $X_0$, $Y_0$ can also be viewed as coordinate offset values which determine an image offset to another position. The inverted coordinates are then transferred to incrementing (+1) circuits 16 and 20, respectively, where one (1) is added, resulting in a negative 2's complement output value for these coordinates. The complementary outputs from incrementing circuits 16 and 20 are added to address counter outputs $X_1$, $Y_1$ in summation elements or adders 17 and 21, respectively. The resulting addends or summations are then each multiplied by the respective rotation or scaling parameters A and B in one of a pair of multipliers 18 and 22. The products generated in multipliers 18 and 22 are then added to each other and the value used for center coordinate $X_0$ in a summation element or adder 23. The output of adder 23 is the address $X_2$ used in addressing video display memory 2 after image processing. Comparing equation 2 above with the circuit shown in FIG. 3, provides an understanding of the relationships being employed during data processing.

A similar operation is undertaken in the circuit illustrated in FIG. 4 to obtain the address $Y_2$. In FIG. 4, input values for $X_0$, $Y_0$ are also input to bit inversion circuits 24 and 28, respectively, where they are inverted bit by bit and then transferred to incrementing (+1) circuits 25 and 29, respectively, where one (1) is added. The complementary outputs from incrementing circuits 25 and 29 are then added to address counter outputs $X_1$, $Y_1$ in adders 26 and 30, respectively, and the resulting addends then each multiplied by the respective rotation or scaling parameters C and D in multipliers 27 and 31, before being added to each other and the value used for center coordinate $Y_0$ in an adder 32. The output of adder 32 is the address $Y_2$ used in addressing video display memory 2 after image processing. In this embodiment, $Y_2$ is then shifted by a factor of 8-bits and added to $X_2$ to obtain the address for display memory 2 used in FIG. 1.

Figure 5:
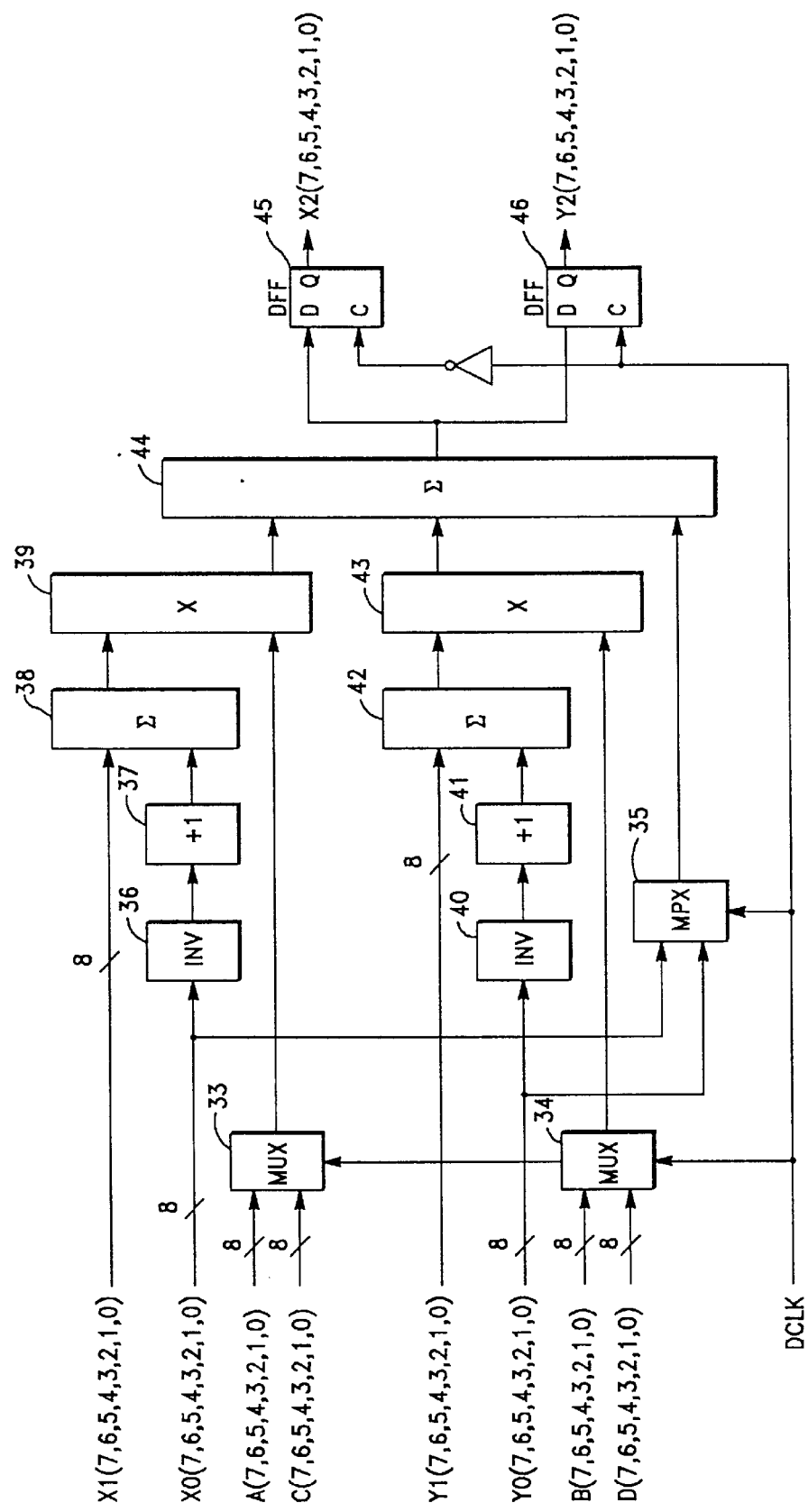
FIG. 5 illustrates a block diagram of a circuit useful for selecting both horizontal and vertical display memory addresses using time-sharing of components.

Because the circuits shown in FIGS. 3 and 4 are essentially identical, either high speed multipliers and adders can be used for high speed high resolution display systems, or the same circuit can be operated on a time-shared basis in a low resolution display device to reduce overall circuit size. An example of this type of circuit configuration is shown in FIG. 5. In FIG. 5, input values for $X_0$, $Y_0$ are input into bit inversion circuits 36 and 40, respectively, where they are inverted as before and transferred to incrementing circuits 37 and 41, respectively. The complementary outputs from incrementing circuits 37 and 41 are then added to address counter outputs $X_1$, $Y_1$ in adders 38 and 42, respectively, and the results multiplied by the respective rotation or scaling parameters in multipliers 39 and 43, before being added to each other and the value used for center coordinates in an adder 44. A series of three multiplexers 33, 34, and 35 are used to selectively switch between values for A, B, and $X_0$ for use in generating $X_2$, and values for C, D, and $Y_0$ for use in generating $Y_2$. The outputs of multiplexers 33 (A or C) and 34 (B or D) are input to multipliers 39 and 43, respectively, and the output of multiplexer 35 is provided as an input ($X_0$ or $Y_0$) to adder 44. The output of adder 44 is transferred to the data inputs (D) of a pair of D-type flip-flop circuits DFF 45 and DFF 46.

Figure 6:
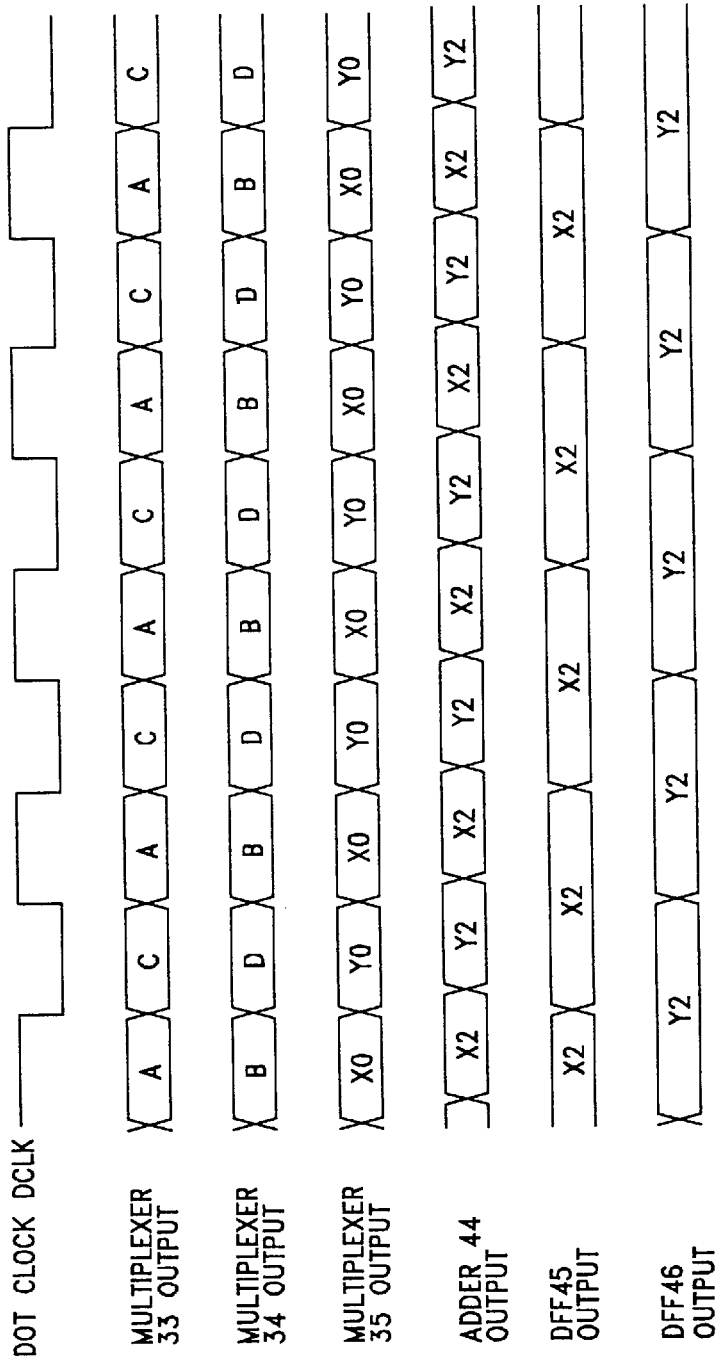
FIG. 6 illustrates a timing chart for operation of the circuit shown in FIG. 5.

Data input to DFF 45 and DFF 46 is output at either a positive or negative going transition or edge of dot clock signal pulses, corresponding to the HIGH or LOW state of the dot clock. An inverter connected in series with the DCLK signal line and the clock input C for DFF 45 assures that it operates on a different pulse edge or transition than DFF 46. The selection of which input is transferred as an output by multiplexers 33, 34, and 35 is determined by the state of the dot clock signal DCLK, which is provided as an input to each of these elements. The timing of these events is illustrated in the timing chart shown in FIG. 6.

As will be apparent from the above description, the CPU does not need to rewrite the contents of display memory 2 to achieve image rotation, or scaling type processing. Such operations can be more simply achieved by rewriting only four parameters, A, B, C, and D, and using video display controller 1 to perform address modifications. By performing parameter operations during the vertical retrace line interval of the particular display device, that is a period of time in which data is not being otherwise transferred for display, smooth image manipulation can be achieved. For example, a smoothly rotating image can be displayed when the values for A, B, C, and D are modified and processed as described above during the vertical retrace interval.

Those skilled in the art will also appreciate from observing FIG. 1, that the horizontal display address counter 4 operates at the dot clock signal (DCLK) frequency or rate, and that the vertical address counter 5 operates at the horizontal synchronization signal (HSYNC) frequency or rate. Therefore, if the change in the four image parameters is synchronized with the DCLK or HSYNC signals, or frequencies, a variety of special depth and perspective effects can be used for image display without changing the source image data stored in memory 2.

The embodiment described above can obtain a display address instantaneously after processing image data for rotation, irrespective of the scanning sequence used by the horizontal and vertical display address counters 4 and 5. It is still possible, however, to achieve further improvement for this type of operation in many applications. An alternative embodiment of the invention which is useful for obtaining this improvement is described next.

The embodiments shown in FIGS. 3 and 4 specifically called for four multipliers operating at the dot clock frequency, while two multipliers operating at one-half of the dot clock frequency are required in the embodiment shown in FIG. 5. The trend in recent display devices, however, is toward high resolution color, and 24-bit type full-color displays using more than a million pixels for image display are commonly available today. Comparable high speed performance is, therefore, required in any corresponding display circuits used with such displays. The above embodiment was described with respect to a low resolution 8-bit address display, but achieving good precision on higher resolution displays requires 10 to 20-bit wide multiplication and addition operations. In addition, if the display refresh rate is in the 60 to 70 MHz range, the dot clock also operates at a frequency of between 60 to 70 MHz, and the display time for one pixel is approximately 15 nanoseconds. It is, therefore, necessary to build the operating circuit from high speed components, or to include a large-scale carry or accumulate circuit to achieve high speed operation with the desired high bit precision in such a short period of time using the operations described above, particularly for multiplication operations. These constraints increase production cost and power consumption, both of which are very undesirable. Problems relating to producing a display device that enables high resolution, full-color display image rotation and scaling, therefore, still remain using the above embodiment.

An alternative embodiment for the video operations controller which achieves the same operating results while employing a low speed multiplier is described next. In this embodiment, the relationships used above, (2) and (3), for implementing the affine transformation, are modified to the form:

$$X_2 = AX_1 + BY_1 + X_i \quad (8)$$

$$Y_2 = CX_1 + DY_1 + Y_i \quad (9)$$

where $X_i$ and $Y_i$ are the initial values further defined as:

$$X_i = (1-A)X_0 - BY_0 \quad (10)$$

$$Y_i = -CX_0 + (1-D)Y_0. \quad (11)$$

Display devices such as cathode ray tube based displays (CRT) generate output images by sequentially scanning dots on a phosphor coated screen, and display devices such as liquid crystal displays (LCD) generate images by sequentially scanning lines of pixel electrodes formed on a substrate surface. In either type of display, the display memory address counter is generally configured to count upward from zero. The values of counter outputs $X_1$, $Y_1$ are, therefore, zero at the beginning of each display frame, with $X_1$ being incremented by one (+1) at the beginning of each dot clock cycle, and $Y_1$ being incremented by one at the beginning of or during each horizontal synchronization signal cycle. If the initial values $X_i$, $Y_i$ are, therefore, obtained according to equations 10 and 11, the addresses $X_2$, $Y_2$, are obtained subsequently as follows.

Horizontal address $X_2$ is obtained by adding the value of A during each dot clock cycle and adding B during each horizontal synchronization signal cycle to initial value $X_i$. Vertical address $Y_2$ is obtained by adding C during each dot clock cycle and D during each horizontal synchronization signal cycle to initial value $Y_i$. The actual memory address is obtained by bit shifting $Y_2$ and adding $X_2$ to the shifted value. As a result, multiplication is not required, and only addition type operations are performed during each dot clock cycle.

The scale or size of the operating circuit can thus be reduced in dot and line sequential-type scanning display devices, such as CRTs and LCDs, by focusing on sequential incrementation of the display address counter starting from a zero value. This alternative embodiment of the invention is described below with reference to FIGS. 7 through 17. In addition to the effects obtained by the first embodiment described above, this embodiment provides additional benefits of not requiring large-scale circuitry, not using a high speed multiplier or other high speed elements, providing low power consumption, and being manufacturable at low cost.

Figure 7:
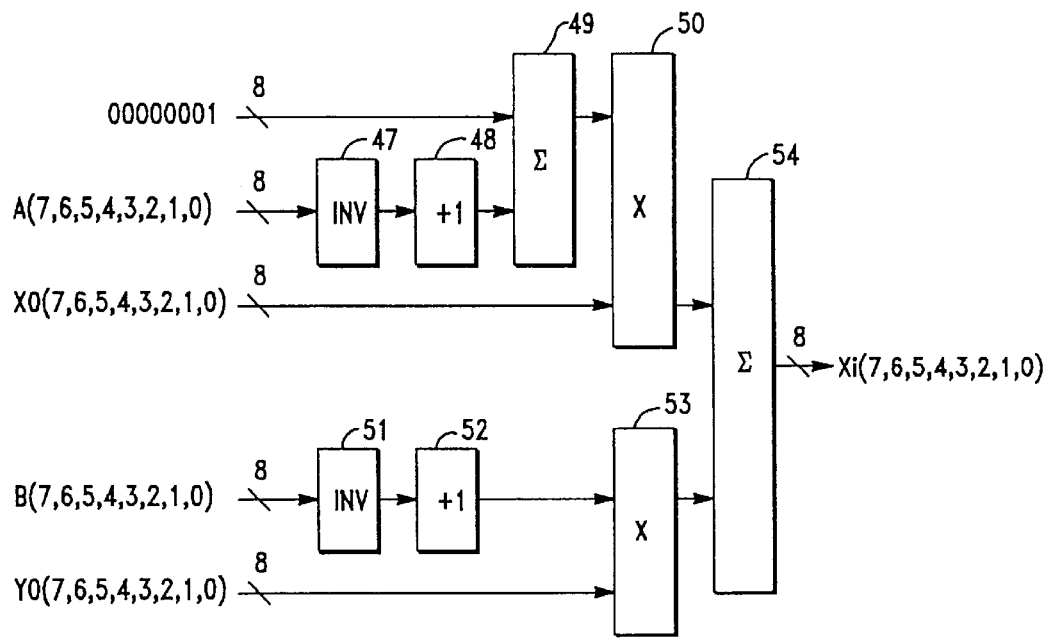
FIG. 7 illustrates a block diagram of a circuit for setting an initial horizontal display address in display memory.
Figure 8:
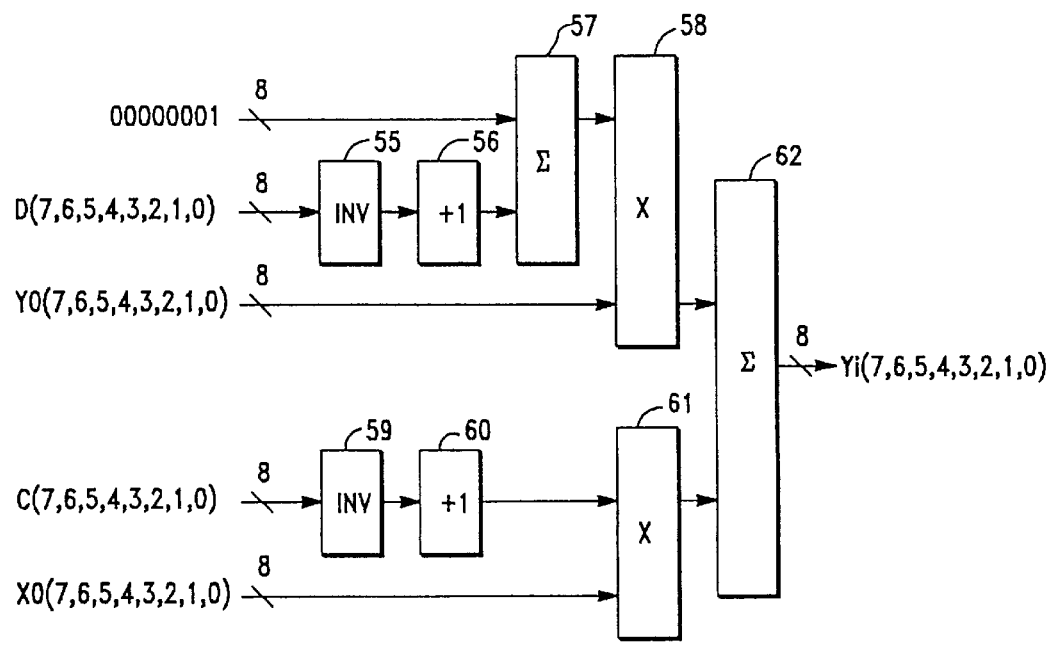
FIG. 8 illustrates a block diagram of a circuit for setting an initial vertical display address in display memory.

Apparatus for calculating the initial values $X_i$, $Y_i$ is described first. As described above, the initial values $X_i$, $Y_i$ can be obtained according to the relationships expressed in equations 10 and 11. Circuits useful for generating these values are shown in FIGS. 7 and 8. As in the first embodiment above, addresses and parameters are illustrated using 8-bit precision.

In the apparatus of FIG. 7, the rotation, or scaling parameters A and B are received and inverted on a bit by bit basis using bit inversion circuits 47 and 51, and then incremented by one (+1) in incrementing circuits 48 and 52, respectively, resulting in a negative 2's complement expression of the parameters. The number or value one is then added to the output of incrementing circuit 48, negative expression of A, in a summation element 49. A product is formed from the additionally incremented addend from summation element 49 and center coordinate $X_0$ by multiplier 50. Inverted parameter B and center coordinate $Y_0$ are likewise multiplied together by multiplier 53. The products from multipliers 50 and 53 are then added together by adder 54 to obtain initial value $X_i$.

The same operation is essentially performed for the initial value $Y_i$ using the circuit shown in FIG. 8. In the apparatus of FIG. 8, rotation, or scaling parameters C and D are received and inverted on a bit by bit basis using bit inversion circuits 55 and 59, and then incremented by one (+1) in incrementing circuits 56 and 60, respectively, with one then being added to the output of incrementing circuit 56, in a summation element 57. A product is formed from the addend from summation element 57 and center coordinate $Y_0$ by multiplier 58, while inverted parameters and center coordinate $X_0$ are likewise multiplied together by multiplier 61. The products from multipliers 58 and 61 are then added together by adder 62 to obtain initial value $Y_i$.

Apparatus or circuits that are being triggered or are operating at the dot clock, DCLK, and horizontal synchronization signal, HSYNC, frequencies or rates in order to generate the desired target address $X_2$, $Y_2$ are described next, in relation to FIGS. 9 and 10, respectively.

Figure 9:
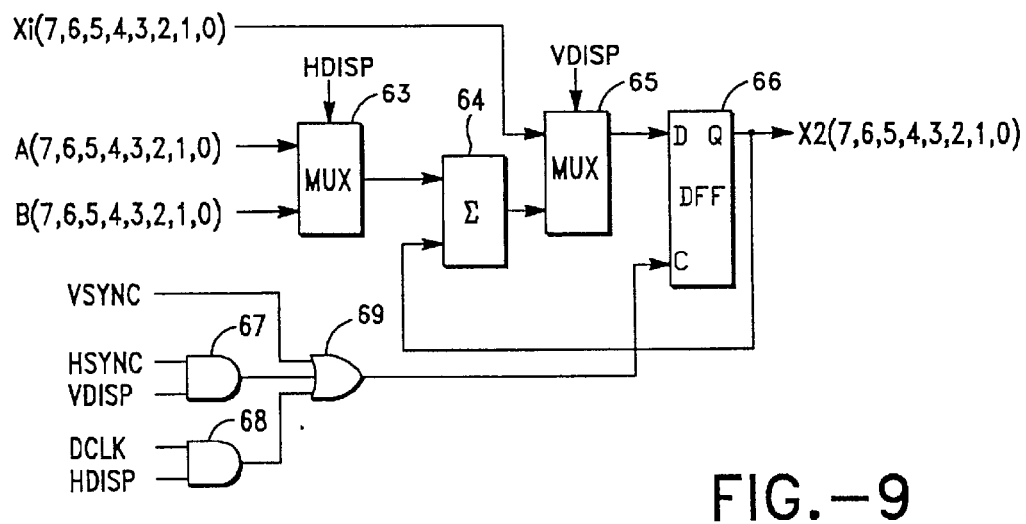
FIG. 9 illustrates a block diagram of a circuit for selecting horizontal display addresses using cumulative addition.

In FIG. 9, the initial value $X_i$ previously generated by the circuit shown in FIG. 7 is input to a multiplexer 65. A flip-flop circuit DFF 66 fetches the output of multiplexer 65 during a display vertical retrace line interval using the positive transition or rising edge of vertical synchronization signal VSYNC as a clock, or trigger. During the vertical display interval, the output of DFF 66 and the value of rotation or scaling parameter A are both selected and added together by a summation element or adder 64. This operation occurs at the horizontal display interval timing rate or frequency, and the resulting addend is applied to the data read by DFF 66 at the occurrence of the dot clock DCLK positive transition. This circuit operation corresponds to generating the first element present in equation 8, above.

Figure 11:
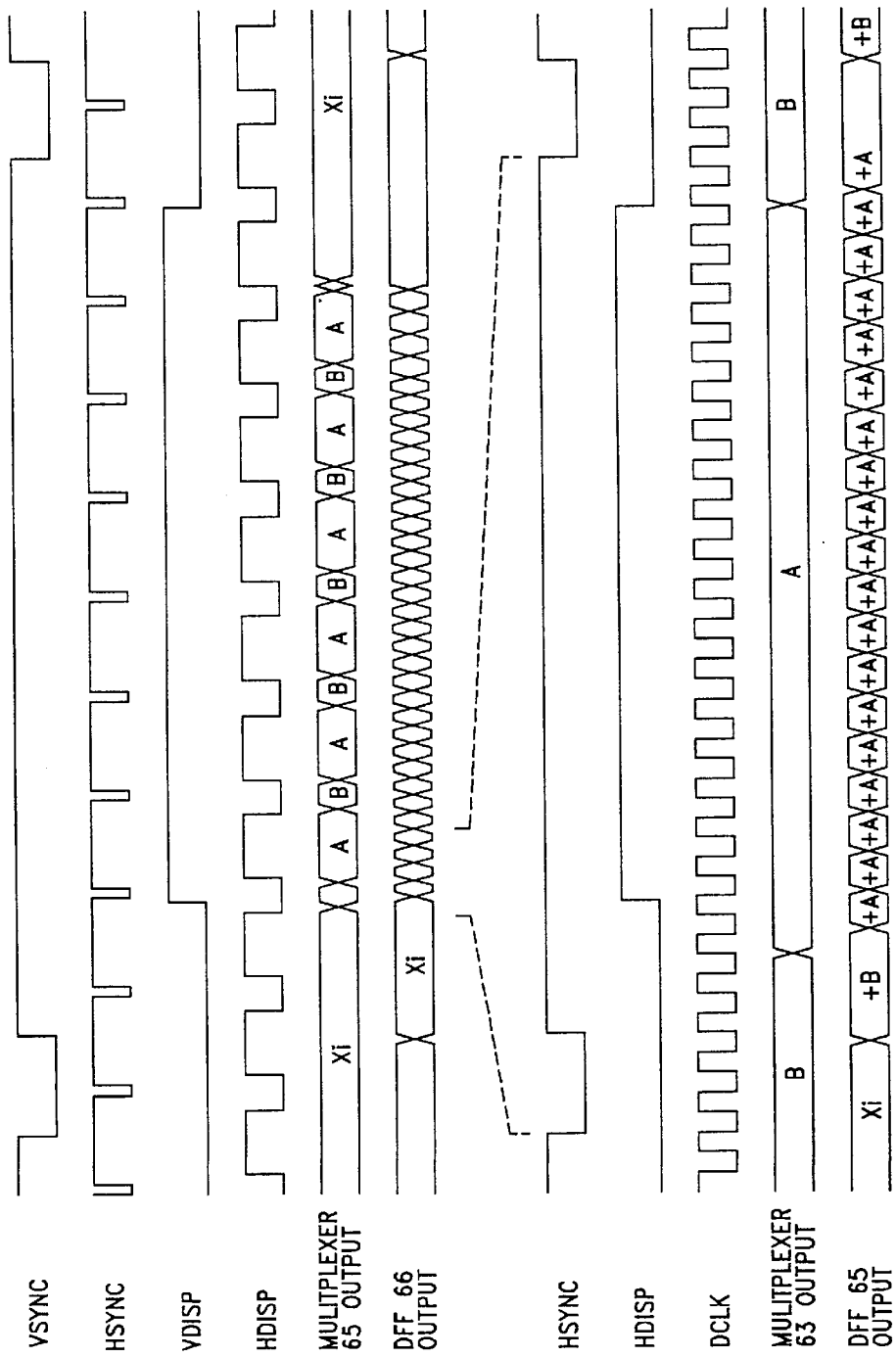
FIG. 11 illustrates a timing chart for operation of the circuit shown in FIG. 10.

During the vertical display interval, the value for parameter B is selected by a multiplexer 63 during the horizontal retrace line interval and added to latched data in or output by DFF 66, and then read by DFF 66 at the occurrence of the positive transition of the horizontal synchronization signal HSYNC. This is the circuit operation corresponding to generation of the second element shown in equation 8, above. For an initial value $X_i$, each rotation, enlargement, or reduction parameter A or B is cumulatively added to obtain the required address $X_2$. The timing chart for operation of the circuit shown in FIG. 9 is shown in FIG. 11.

Figure 10:
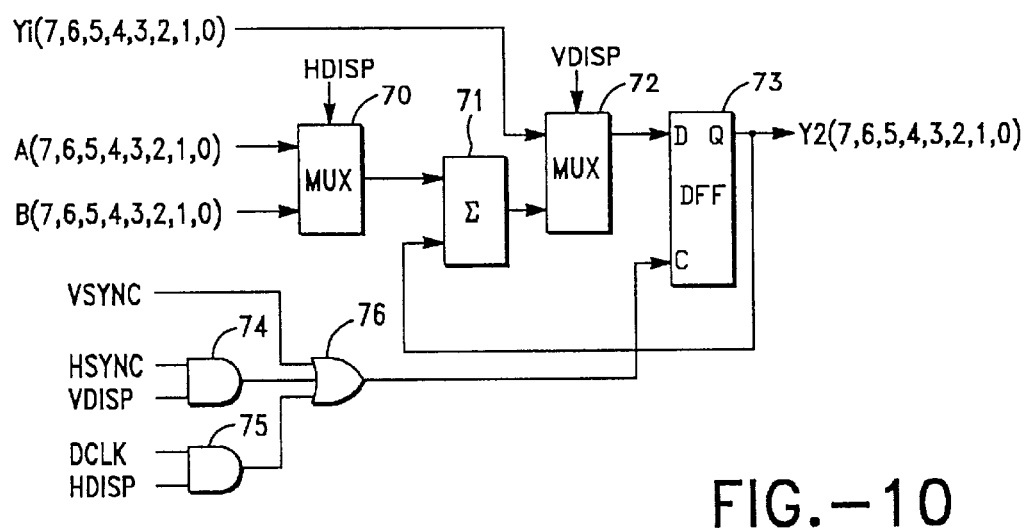
FIG. 10 illustrates a block diagram of a circuit for selecting vertical display address using cumulative addition.

The operating principle for the circuit shown in FIG. 10 is identical to that described above for FIG. 9, except that it operates on a different initial value for the address and rotation, enlargement, or reduction parameters. In this manner, address value $Y_2$ is also output as a cumulative sum.

In FIG. 10, initial value $Y_i$ previously generated by the circuit shown in FIG. 8 is input to a multiplexer 65, whose output is fetched by a flip-flop circuit DFF 73 during a display vertical retrace line interval using vertical synchronization signal VSYNC as a clock, or trigger. During the vertical display interval, the output of DFF 73 and parameter C are both selected and added together by adder 71, at the horizontal display interval timing rate or frequency. The resulting addend is applied to the data read by DFF 73 using the dot clock DCLK signal for a clock. This circuit operation corresponds to generating the first element present in equation 8, above.

During the vertical display interval, the value for parameter D is selected by a multiplexer 70 during the horizontal retrace line interval and added to the output of DFF 73, and then read by DFF 73 using the horizontal synchronization signal HSYNC. This corresponds to generation of the second element shown in equation 9, above. For an initial value $Y_i$, each rotation, enlargement, or reduction parameter C or D is cumulatively added to obtain the required address $Y_2$.

Using this configuration the initial values in equations 10 and 11 can be generated using simple multiplication and addition elements, and addresses can be obtained relative to any specific display device timing by cumulatively adding the corresponding rotation, enlargement, or reduction parameters in synchronization with the counting of the address counters, which is accomplished by using the dot clock or horizontal synchronization signal as a clock source. As can be seen from FIGS. 9 and 10, the display system uses flip-flops for data latching, along with multiplexers and adders, and can be realized in a small scale circuit. Furthermore, because only summations are executed using the timing of the dot clock, the display system can also be applied to high resolution displays using a high dot clock rate or frequency.

The timing used in operating the inventive display system to obtain the initial values required for the multiplication operation is described next.

Assuming the system is displaying a smooth rotating image, this image can be easily obtained by first having CPU 7 write display data describing the rotating body to display memory 2, and then change the angle of rotation, i.e., parameters A, B, C, D, for each subsequent display frame. In the circuits shown in FIGS. 9 and 10, the initial values $X_i$, $Y_i$ are read into DFF 66 and DFF 73, respectively, when a positive transition of the vertical synchronization signal VSYNC occurs. For timing purposes it is, therefore, sufficient to rewrite the desired image parameters during the vertical retrace line interval after the end of the appropriate display frame period.

Figure 12:
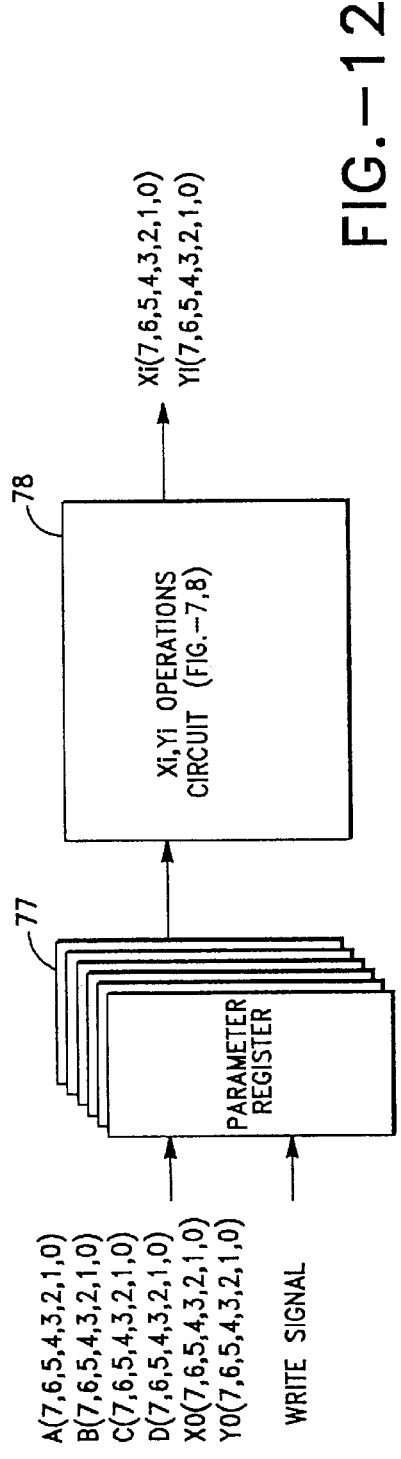
FIG. 12 illustrates a block diagram of a circuit for applying parameters for the initial value circuits of FIGS. 7 and 8.

This process is depicted in FIG. 12, where a parameter register file 77 is used to receive and latch parameters A, B, C, D, and $X_0$, $Y_0$. The CPU detects the start of a vertical retrace line interval by polling or interrupting synchronization signals, generates a write signal to transfer the current parameter set, and then rewrites the parameter set for the next frame. Video operations controller 78 receives the new parameter set during each CPU write operation, and generates the initial value for initial values $X_i$, $Y_i$ for the next frame. For timing purposes, it is sufficient if the result is produced by the time the next positive transition of the vertical synchronization signal VSYNC occurs, at which time the result is applied to the cumulative adding circuit as shown in FIGS. 9 or 10.

Figure 13:
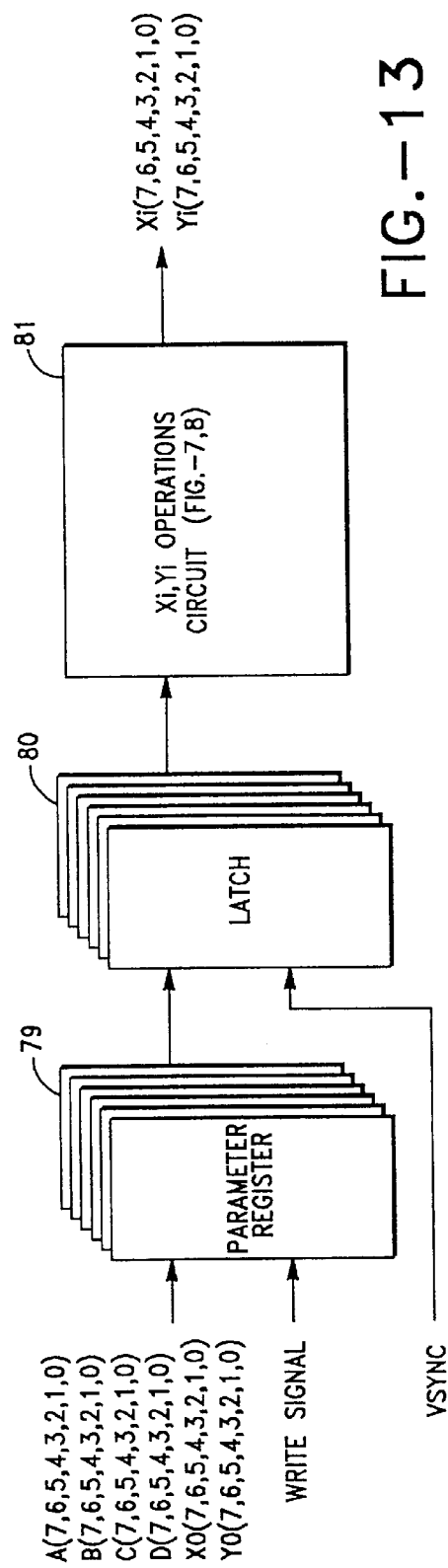
FIG. 13 illustrates a block diagram of a circuit for applying parameters for the initial value circuits of FIGS. 7 and 8 using double buffering.

In the example shown in FIG. 12, it is necessary for the CPU to detect the beginning of the vertical retrace line interval using some technique. An alternative example is shown in FIG. 13, is which the parameter register file is configured as a double buffered register using a latch 80.

It is, therefore, not necessary for the CPU to accurately detect the beginning of each vertical retrace line interval, and the parameter register file contents can be rewritten at any desired time because the data is held ready in latch 80.

Furthermore, the clock used for latch 80 operates at the vertical synchronization signal VSYNC rising edge, which means that if the CPU uses this transition to determine when to rewrite the parameter register file and the initial values $X_i$, $Y_i$, operations controller 81 is allowed the greatest possible time period for preparing address values, typically on the order of approximately 16 ms, the equivalent of one image display frame. High speed operation is, therefore, not required within this circuit to match the display device and it is more easily built.

Another possible approach to image display involves rewriting the image parameters A, B, C, D for each and every display line after the image data is first stored to display memory 2. If the parameter corresponding to an enlargement ratio in the horizontal or "X" direction is rewritten for each display line using a higher magnification rate or ratio toward the top of the display and a lower one toward the bottom, the resulting image will appear to be tilting forward toward a display viewer. If a ratio of the different upper and lower magnification rates is increased for each subsequent image display frame, the image can be made to appear as though it is tilting forward without rewriting the contents of display memory.

Because the parameters A, B, C, and D are rewritten in this embodiment for every display line, the sum obtained by cumulative addition with preceding lines cannot be used for address calculation. The initial value must be reset in accordance with the timing of rewriting parameter values. Consider, for example, using cumulative addition according to parameters set at the beginning of the frame until line "n" and rewriting the parameters from line "n+1". If the parameters after being rewritten are A', B', C', D', $X_0'$, and $Y_0'$, then the corresponding affine transformation becomes:

$$X_2 = A'X_1 + B'Y_1 + X_i \quad (12)$$

$$Y_2 = C'X_1 + D'Y_1 + Y_i \quad (13)$$

where $X_i$ and $Y_i$ are the initial values defined as:

$$X_i = (1-A')X_0' - B'Y_0' \quad (14)$$

$$Y_i = -C'X_0' + (1-D')Y_0' \quad (15)$$

and assumed to be values set at the beginning of the frame.

Because $X_i$ and $Y_i$ are actually set after line "n", for the horizontal address $X_2$, the cumulative sum of B'n-times and A'(n×w)-times is used as the initial value for line "n+1" where w is the number of horizontal dots in one line. Therefore, if the initial values from line "n+1" are $X_j$ and $Y_j$, then:

$$X_j = (1-A')X_0' - B'Y_0' + nwA' + nB' \quad (16)$$

$$Y_j = -C'X_0' + (1-D')Y_0' + nwC' + nD' \quad (17)$$

Figure 14:
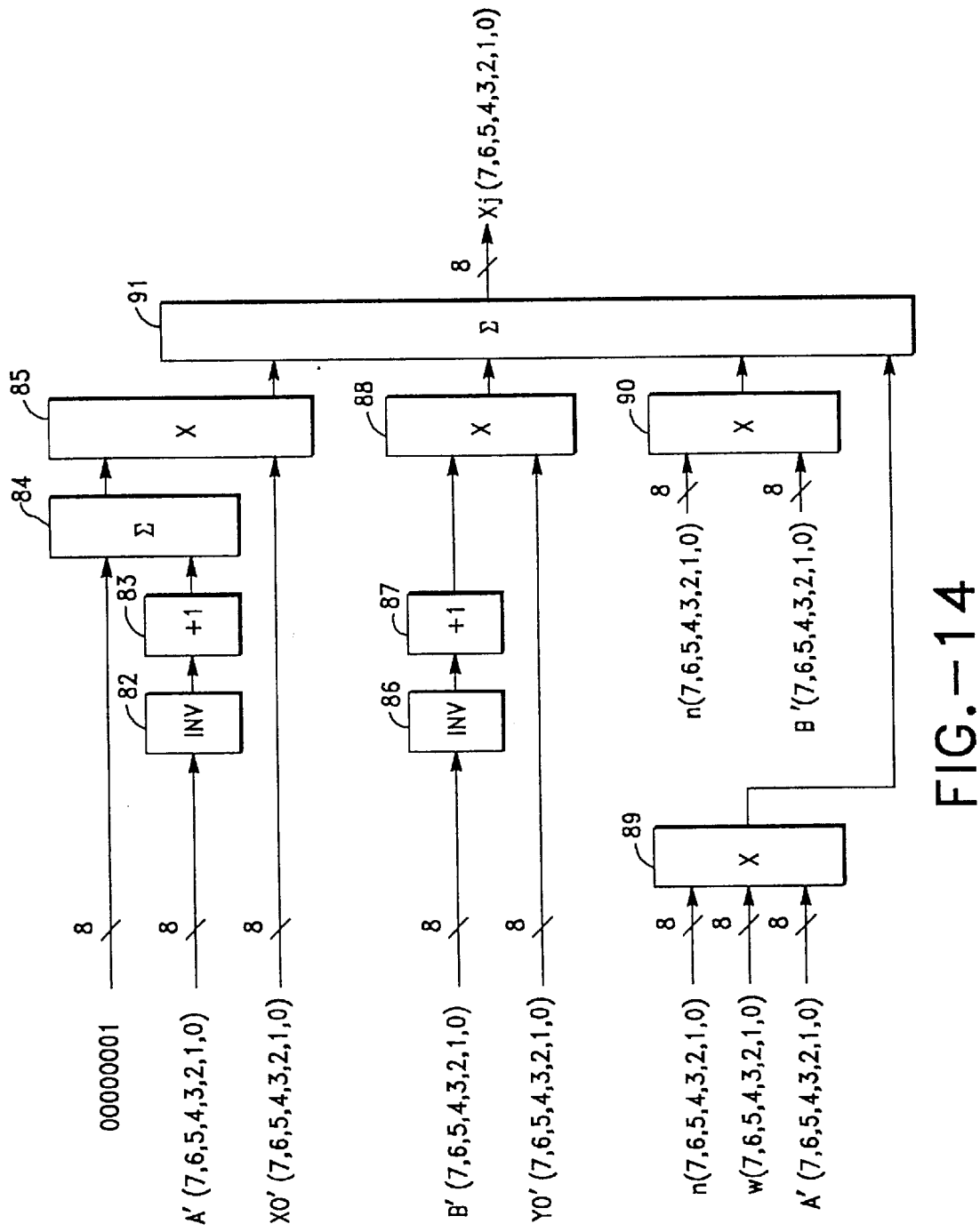
FIG. 14 illustrates a block diagram of a circuit for determining an initial horizontal display address line "n" in display memory.
Figure 15:
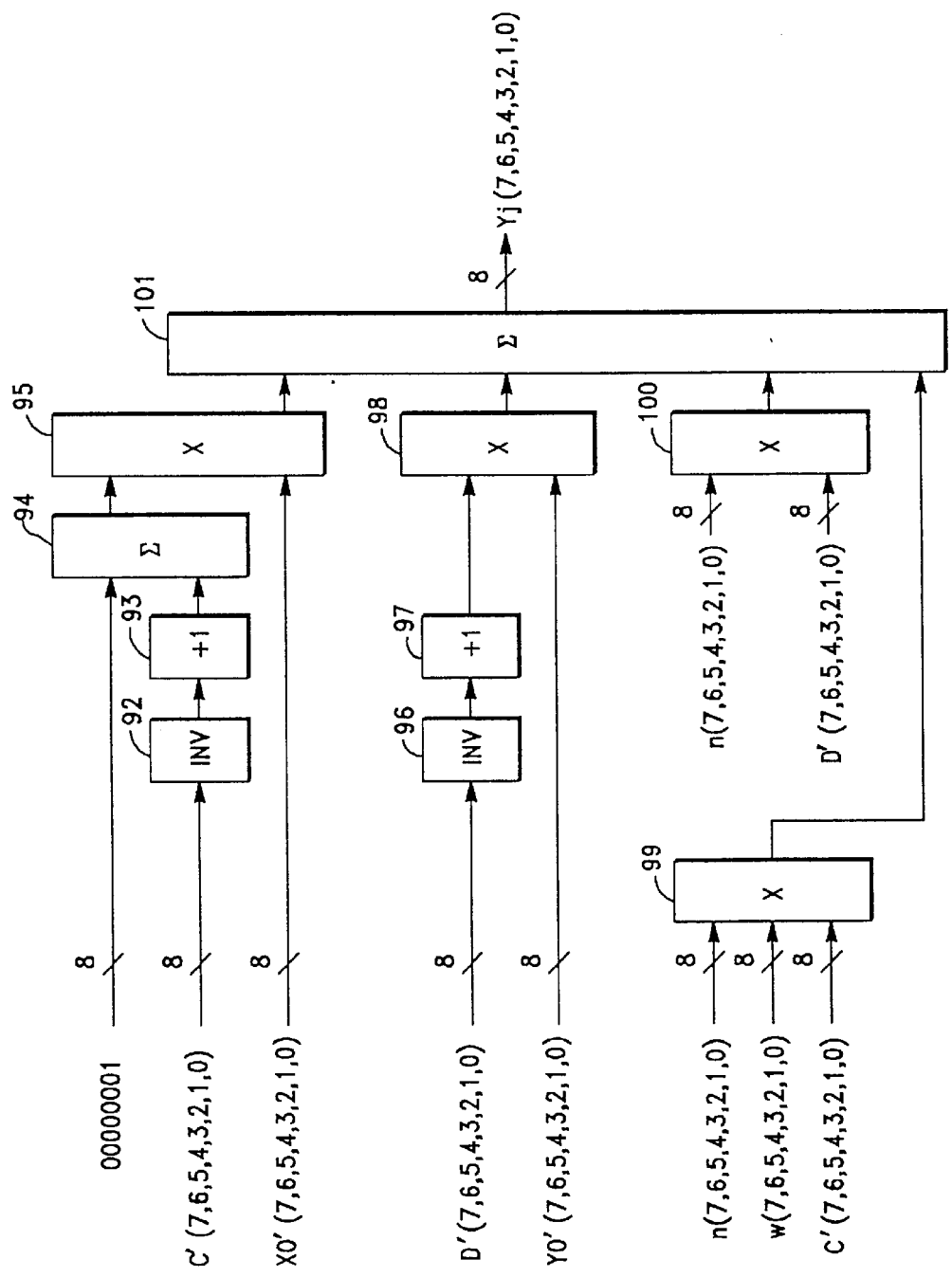
FIG. 15 illustrates a block diagram of a circuit for determining an initial vertical display address line "n" in display memory.

Circuits used to obtain initial values are slightly more complex than those used when rewriting parameters once per frame, and exemplary embodiments are shown in FIGS. 14 and 15. These circuits are essentially the circuits shown in FIGS. 7 and 8 with additional components added to generate the third and fourth elements shown in equations 14 and 15.

In the apparatus of FIG. 14, parameters A' and B' are received and inverted using bit inversion circuits 82 and 86, and then incremented in incrementing circuits 83 and 87, respectively, with one then being added to the output of incrementing circuit 83, in a summation element 84. A product is formed from the addend from summation element 84 and center coordinate $X_0'$ by multiplier 85, while inverted parameter B' and center coordinate $Y_0'$ are likewise multiplied together by multiplier 88. The factors "n" and "w" are used to form a product with A' in a multiplier 89 while the product of "n" and B' is formed in a multiplier 90. The products from multipliers 85, 88, 89, and 90 are then added together by adder 91 to obtain initial value $X_j$.

In the apparatus of FIG. 15, parameters C' and D' are received and inverted using bit inversion circuits 92 and 96, and then incremented in incrementing circuits 93 and 97, respectively, with one then being added to the output of incrementing circuit 93, in a summation element 94. A product is formed from the addend from adder 94 and center coordinate $Y_0'$ by multiplier 58, while inverted parameter C' and center coordinate $X_0'$ are likewise multiplied together by multiplier 61. The factors "n" and "w" are used to form a product with C' in a multiplier 99 while the product of "n" and D' is formed in a multiplier 100. The products from multipliers 95, 98, 99, and 100 are then added together by adder 101 to obtain initial value $Y_j$.

Circuits used for cumulative addition after generation of the initial values are as shown in FIGS. 9 and 10 with the single exception being that the initial values are set during the horizontal retrace line interval by multiplexers 65 and 72, whereas the vertical retrace line interval was originally used in the circuits shown in FIGS. 9 and 10. Furthermore, as described with reference to FIG. 13, if a double buffer circuit configuration is used and parameter latching corresponds to the timing of the horizontal synchronization signal HSYNC, it is sufficient to generate the initial values using the operations shown in equations 14 and 15 during one horizontal scanning period, since this is typically an interval of approximately 63 $\mu$sec, and it is not necessary to build the circuits with high speed elements.

The configuration of the initial value generating video operations controller that uses multiplication is described next.

Figure 16:
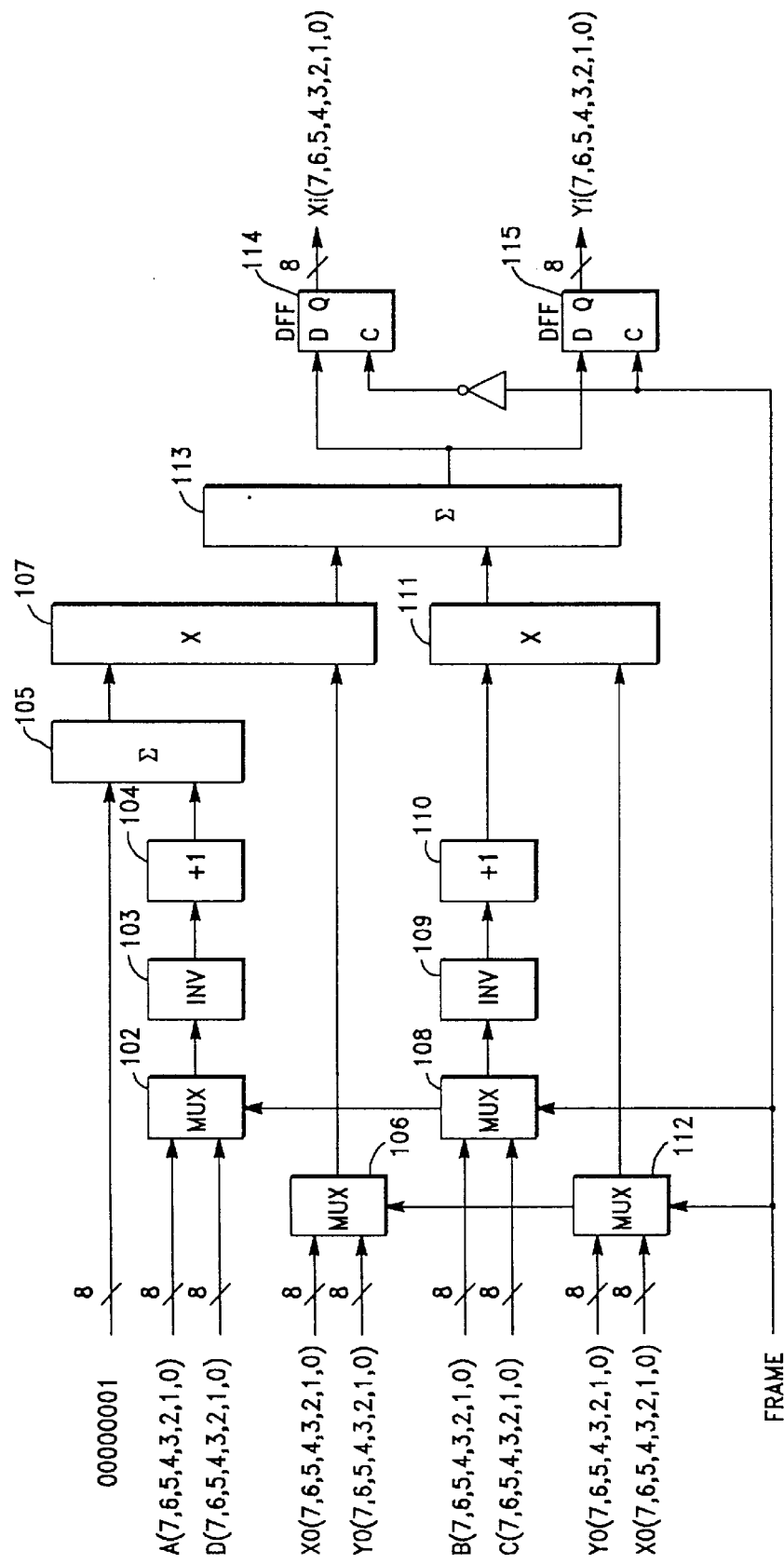
FIG. 16 illustrates a block diagram of a circuit for determining initial horizontal and vertical display addresses of line "n" in display memory using time-sharing of components.
Figure 17:
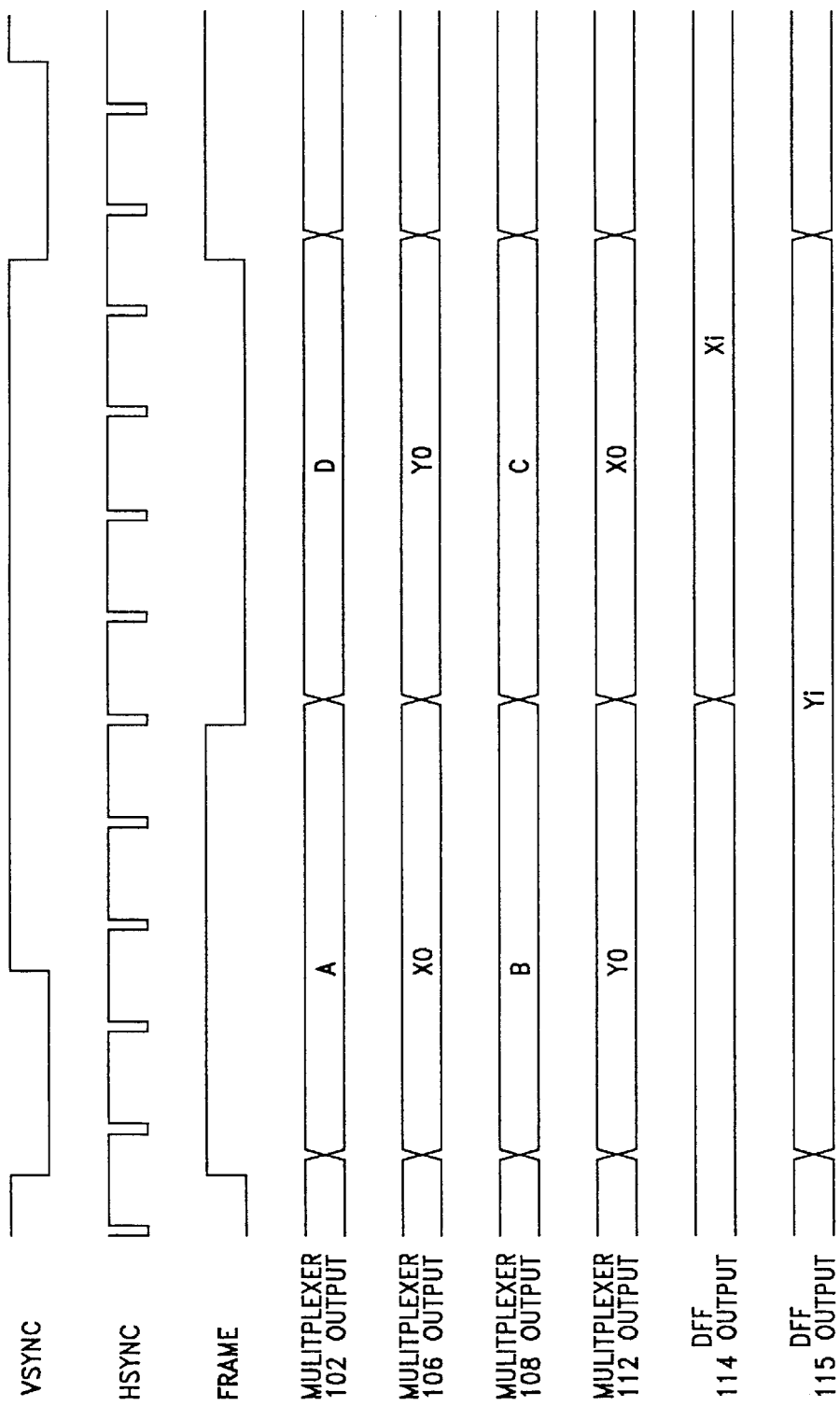
FIG. 17 illustrates a timing chart for operation of the circuit shown in FIG. 16.

As will be apparent to those skilled in the art from the above descriptions, low speed elements and circuits can be used for the multiplication operation used to obtain the initial values because it is not necessary to operate at the same rate as the dot clock. If, however, for example, initial value multiplication circuits as shown in FIGS. 7 and 8 are used in parallel, four multipliers are required and the circuit scale is necessarily larger. Noting that these circuits are identically configured, it is possible to use a single circuit to obtain both values by using time-shared component process. A circuit of this type is shown in FIG. 16. The FRAME signal shown in FIG. 16 is synchronized with the display unit frame timing, and has a 50% duty cycle in this embodiment. A timing chart for these operation is presented in FIG. 17.

Depending upon whether the FRAME signal is in a HIGH or LOW state, level, multiplexers 102, 106, 108, and 112 select between input values for A or D, $X_0$ or $Y_0$, B or C, and $Y_0$ or $X_0$, respectively. As before, the output of multiplexer 102 is inverted and incremented using inverter 103 and incrementing circuit 104 before being added to one in adder 105. The addend from adder 105 is multiplied by the output of multiplexer 106 in multiplier 107 and the resulting product transferred to adder 113. In the mean time, the output of multiplexer 108 is inverted and incremented using inverter 109 and incrementing circuit 110 before being multiplied by the output of multiplexer 112 in multiplier 111 and the resulting product transferred to adder 113.

Adder 113 therefore outputs $X_i$ during the first half of the display frame, and $Y_i$ during the second half of the display frame. DFF 114 and DFF 115 each latch these respective signals, and output the results as the initial values to the cumulative adders shown in FIGS. 9 and 10, during different phases of the FRAME signal. Because the display time of a single frame is sufficiently long, high speed operation is not necessary and the circuit scale can be reduced even when a single circuit is operated with time-shared processing.

Using the present invention as disclosed above, rotated, enlarged, or reduced image displays are possible without having a CPU rewrite display data in display memory. Smooth image rotation can be obtained during display without requiring high speed multiplication operations at the dot clock frequency by using a multiplication operation once every display frame or display line, and one cumulative addition operation every dot or display line. Circuit complexity or size can be reduced, allowing reduced manufacturing cost because low clock rate multipliers can be used, and any multipliers can be operated on a time-shared basis.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

| Appendix of Numeral Designations in Figures | |
|---|---|
| 1 Video operations controller | 59 Bit inversion circuit |
| 2 Display memory | 60 Incrementing circuit |
| 3 Display device | 61 Multiplier |
| 4 Horizontal display address counter | 62 Adder |
| 5 Vertical address counter | 63 Multiplexer |
| 6 Parameter register | 64 Adder |
| 7 CPU | 65 Multiplexer |
| 8 Operations controller | 66 D type flip-flop |
| 9 Display memory | 67 AND gate |
| 10 Display device | 68 AND gate |
| 11 Horizontal display address counter | 69 OR gate |
| 12 Vertical address counter | 70 Multiplexer |
| 13 Parameter register | 71 Adder |
| 14 CPU | 72 Multiplexer |
| 15 Bit inversion circuit | 73 D type flip-flop |
| 16 Incrementing circuit | 74 AND gate |
| 17 Adder | 75 AND gate |
| 18 Multiplier | 76 OR gate |
| 19 Bit inversion circuit | 77 Parameter register |
| 20 Incrementing circuit | 78 Initial value operating circuit |
| 21 Adder | 79 Parameter register |
| 22 Multiplier | 80 Latch |
| 23 Adder | 81 Initial value operating circuit |
| 24 Bit inversion circuit | 82 bit inversion circuit |
| 25 Incrementing circuit | 83 Incrementing circuit |
| 26 Adder | 84 Adder |
| 27 Multiplier | 85 Multiplier |
| 28 Bit inversion circuit | 86 Bit inversion circuit |
| 29 Incrementing circuit | 87 Incrementing circuit |
| 30 Adder | 88 Multiplier |
| 31 Multiplier | 89 Multiplier |
| 32 Adder | 90 Multiplier |
| 33 Multiplexer | 91 Adder |
| 34 Multiplexer | 92 Bit inversion circuit |
| 35 Multiplexer | 93 Incrementing circuit |
| 36 Bit inversion circuit | 94 Adder |
| 37 Incrementing circuit | 95 Multiplier |
| 38 Adder | 96 Bit inversion circuit |
| 39 Multiplier | 97 Incrementing circuit |
| 40 Bit inversion circuit | 98 Multiplier |
| 41 Incrementing circuit | 99 Multiplier |
| 42 Adder | 100 Multiplier |
| 43 Multiplier | 101 Adder |
| 44 Adder | 102 Multiplexer |
| 45 D type flip-flop | 103 Bit inversion circuit |
| 46 D type flip-flop | 104 Incrementing circuit |

| Appendix of Numeral Designations in Figures | |
|---|---|
| 47 Bit inversion circuit | 105 Adder |
| 48 Incrementing circuit | 106 Multiplexer |
| 49 Adder | 107 Multiplier |
| 50 Multiplier | 108 Multiplexer |
| 51 Bit inversion circuit | 109 Bit inversion circuit |
| 52 Incrementing circuit | 110 Incrementing circuit |
| 53 Multiplier | 111 Multiplier |
| 54 Adder | 112 Multiplexer |
| 55 Bit inversion circuit | 113 Adder |
| 56 Incrementing circuit | 114 D type flip-flop |
| 57 Adder | 115 D type flip-flop |
| 58 Multiplier | |

What is claimed is:

1. A display circuit for manipulating an image to be viewed on a display device, said display circuit comprising:

a display memory containing pixel data defining a first image;

an address counter for generating first addresses related to the order for reading the pixel data from the display memory for viewing the first image on the display device;

parameter memory for storing rotation and scaling parameters for manipulating the first image; and a display operations controller for transforming the first addresses from the address counter into second addresses in accordance with the parameters from the parameter memory and for reading the pixel data in sequence from the display memory in accordance with the second addresses in synchronization with synchronization signals for the display device, the pixel data read from the display memory being outputted to the display device.

2. The display circuit of claim 1 wherein the display operations controller transforms the first addresses by an affine transformation.

3. The display circuit of claim 2 wherein said affine transformation is defined as $$\begin{pmatrix} X2 \\ Y2 \end{pmatrix} = \begin{pmatrix} AB \\ CD \end{pmatrix} \begin{pmatrix} X1 - X0 \\ Y1 - Y0 \end{pmatrix} + \begin{pmatrix} X0 \\ Y0 \end{pmatrix}$$

wherein said rotation and scaling parameters are given by rotation and scaling factors $$\begin{pmatrix} AB \\ CD \end{pmatrix}$$

and a coefficient of central axes $$\begin{pmatrix} X0 \\ Y0 \end{pmatrix},$$

and
said second addresses $$\begin{pmatrix} X2 \\ Y2 \end{pmatrix}$$

are determined by the affine transformation of the first addresses $$\begin{pmatrix} X1 \\ Y1 \end{pmatrix}.$$

4. The display circuit of claim 3, wherein said display operations controller comprises:
 a first adder circuit for calculating X1−X0;
 a second adder circuit for calculating Y1−Y0;
 a first multiplexer for inputting the factors A and C and outputting either one of these factors according to time division;
 a second multiplexer for inputting the factors B and D and outputting either one of these factors according to the time division;
 a first multiplier circuit for multiplying one of the factors A and C outputted by said first multiplexer by an output of said first adder circuit;
 a second multiplier circuit for multiplying one of the factors B and D outputted by said second multiplexer by an output of said second adder circuit; and
 a third adder circuit for adding an output of said first adder circuit, output of said second adder circuit, and said X0 or Y0.

5. The display circuit of claim 3, wherein said display operations controller comprises:
 first multiplier and adder circuits for calculating Xi=(1−A)X0−BY0;
 second multiplier and adder circuits for calculating Yi=−CX0+(1−D)Y0;
 an address counter for generating X1 and Y1 by sequentially and incrementally counting;
 a third adder circuit for cumulatively calculating the value of X2 at a rate of A at each increment of 1 performed for X1 by said address counter and the value of X2 at a rate of B at each increment of 1 performed for Y1 by said address counter, wherein X2=AX1+BY1+Xi; and
 a fourth adder circuit for cumulatively calculating the value of Y2 at a rate of C at each increment of 1 performed for X1 by said address counter and the value of Y2 at a rate of D at each increment of 1 performed for Y1 by said address counter, wherein Y2=CX1+DY1+Yi.

6. The display circuit of claim 5, wherein said parameter memory stores said parameters for each frame.

7. The display circuit of claim 5, wherein said parameter memory stores said parameters for each line.

8. The display circuit of claim 3 wherein said arithmetic circuit comprises:
 first multiplier and adder circuits for calculating Xi=(1−A)X0−BY0;
 second multiplier and adder circuits for calculating Yi=−CX0+(1−D)Y0;
 a third adder circuit for cumulatively calculating the value of X2 at a rate of A in synchronism with a dot clock from said display device and the value of X2 at a rate of B in synchronism with a horizontal synchronism signal of the display signal, wherein X2=AX1+BY1+Xi; and
 a fourth adder circuit for cumulatively calculating the value of Y2 at a rate of C in synchronism with a dot clock from said display device and the value of Y2 at a rate of D in synchronism with a horizontal synchronism signal from the display circuit, wherein Y2=CX1+DY1+Yi.

9. The display circuit of claim 8, wherein said parameter memory stores said parameters in timing synchronous with a vertical synchronism signal of said display device.

10. The display circuit of claim 8, wherein said parameter memory stores said parameters in timing synchronous with a horizontal synchronism signal of said display circuit.

11. The display circuit of claim 3 wherein said arithmetic circuit comprises:
 a first multiplier and adder circuits for calculating Xi=(1−A)X0−BY0;
 second multiplier and adder circuits for calculating Yi=−CX0+(1−D)Y0;
 a third adder circuit for cumulatively calculating the value of X2 at a rate of B and the value of X2 at a rate of C, for calculating wherein X2=AX1+BY1+Xi; and
 a fourth adder circuit for cumulatively calculating the value of Y2 at a rate of C and the value of Y2 at a rate of D, wherein Y2-CX1+DY1+Yi.

12. The display circuit of claim 3, wherein said arithmetic circuit comprises:
 first multiplier and adder circuits for calculating Xi=(1−A)X0−BY0 in synchronism with a vertical synchronism signal of the display circuit;
 second multiplier and adder circuits for calculating Yi=−CX0+(1−D)Y0 in synchronism with a vertical synchronism signal of the display circuit;
 a third adder circuit for cumulatively calculating the value of X2 at a rate of A in synchronism with a dot clock from the display device and the value of X2 at a rate of B in synchronism with a horizontal synchronism signal from the display wherein X2=AX1+BY1+Xi; and
 a fourth adder circuit for cumulatively calculating the value of Y2 at a rate of C in synchronism with a dot clock from the display device and the value of Y2 at a rate of D in synchronism with a horizontal synchronism signal from the display circuit, wherein Y2=CX1+DY1+Yi.

13. The display circuit of claim 2 wherein said display operations controller includes a multiplier circuit which computes initial values of said second addresses during a vertical retrace line interval.

14. The display circuit of claim 2 wherein said display operations controller includes a multiplier circuit for computing initial values for the second addresses at a rate synchronous with both a vertical synchronism signal and a horizontal synchronism signal.

15. The display circuit of claim 2 where said display operations controller includes a multiplier circuit which computes initial values for the second addresses during a horizontal retrace line interval.

16. The display circuit of claim 1, wherein said parameter memory stores said parameters at a clock rate corresponding to a vertical synchronism signal of said display device.

17. The display circuit of claim 1, wherein said parameter memory stores said parameters at a clock rate corresponding to a horizontal synchronism signal of said display device.

18. The display circuit of claim 1, wherein said parameter memory stores said parameters for each frame.

19. The display circuit of claim 1, wherein said parameter memory stores said parameters for each line.

20. The display circuit of claim 1 wherein said display operations controller cumulatively adds up a value according to said parameters to said second addresses at each increment of output counted by said counter.

21. The display circuit of claim 1, wherein said display operations controller comprises:

a first adder circuit for cumulatively adding up said parameters at a rate synchronous with a dot clock of said display circuit; and a second adder circuit for cumulatively adding up said parameters in synchronism with a signal synchronized with a horizontal synchronism signal of said display circuit.

22. The display circuit of claim 21, wherein said parameter memory stores said parameters at a clock rate corresponding to a vertical synchronism signal of said display device.

23. The display circuit of claim 21, wherein said parameter memory stores said parameters at a clock rate corresponding to a horizontal synchronism signal of said display device.

24. The display circuit of claim 1, wherein said display operations controller comprises:

a multiplier circuit for computing initial values at a rate synchronous with a vertical synchronism signal of said display circuit;

a first adder circuit for cumulatively adding up said parameters at a rate synchronous with a dot clock of said display circuit; and a second adder circuit for cumulatively adding up said parameters in synchronism with a horizontal synchronism signal of said display circuit.

25. The display circuit of claim 1, wherein said display operations controller includes a multiplier circuit which computes initial values for the second addresses during a horizontal retrace line interval.

26. The display circuit of claim 1 wherein said display operations controller includes a multiplier circuit which computes initial values of said second addresses during a vertical retrace line interval.

27. The display circuit of claim 1, wherein said display operations controller includes:

a multiplier circuit for computing initial values for the second addresses at a rate synchronous with both a vertical synchronism signal and a horizontal synchronism signal.

28. A display circuit for manipulating an image to be viewed on a display device, said display circuit comprising:

a display memory containing pixel data defining a first image;

an address counter for generating first addresses related to the order for reading the pixel data from the display memory for viewing the first image on the display device in sequence in synchronization with synchronization signals for the display device;

a parameter memory for storing rotation and scaling parameters for manipulating the first image; and a display controller for transforming the first addresses from the address counter into second addresses in accordance with the parameters from the parameter memory in synchronization with the synchronization signals and for reading the pixel data from the display memory in sequence in accordance with the second address in synchronization with the synchronization signals, the pixel data read from the display memory being outputted to the display device.

* * * * *

UNITED STATES PATENT AND TRADEMARK OFFICE
CERTIFICATE OF CORRECTION

PATENT NO.    : 5,864,347
DATED         : January 26, 1999
INVENTOR(S)   : Kazuaki Inoue It is certified that error appears in the above-identified patent and that said Letters Patent is hereby corrected as shown below:

Column 15,
Line 49, change "arithmetic" to -- display --.
Line 50, change "circuit" to -- operations controller --.

Column 16,
Line 7, change "arithmetic" to -- display --.
Line 8, change "circuit" to -- operations controller --.
Line 18, change "Y2-CX1+DY1+Yi" to -- Y2=CX1+DY1+Yi --.
Line 19, change "arithmetic" to -- display --.
Line 20, change "circuit" to -- operations controller --.

Signed and Sealed this

Eighth Day of January, 2002

*Attest:*

JAMES E. ROGAN
*Attesting Officer*    *Director of the United States Patent and Trademark Office*